March 17, 1953 — M. J. E. GOLAY — 2,631,489
MONOCHROMATOR
Filed Jan. 12, 1949 — 2 SHEETS—SHEET 1
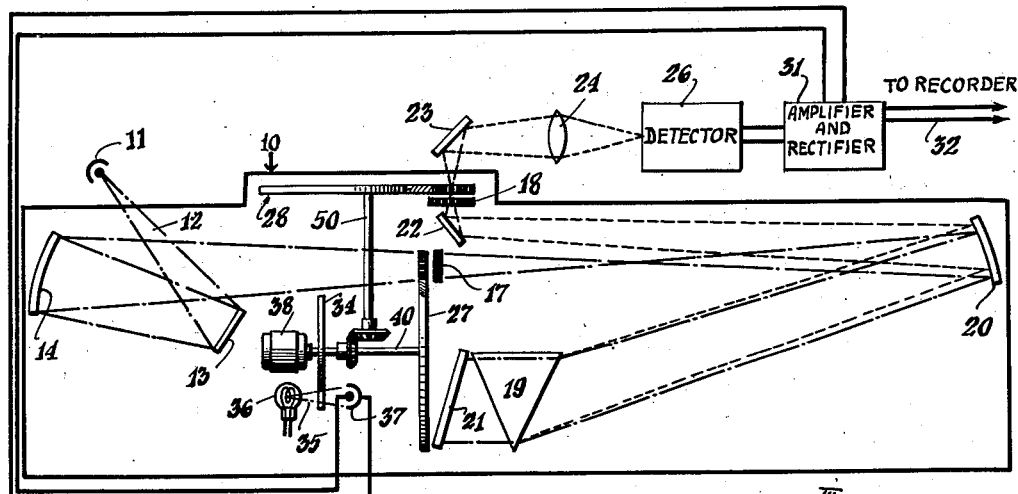
Fig. 1
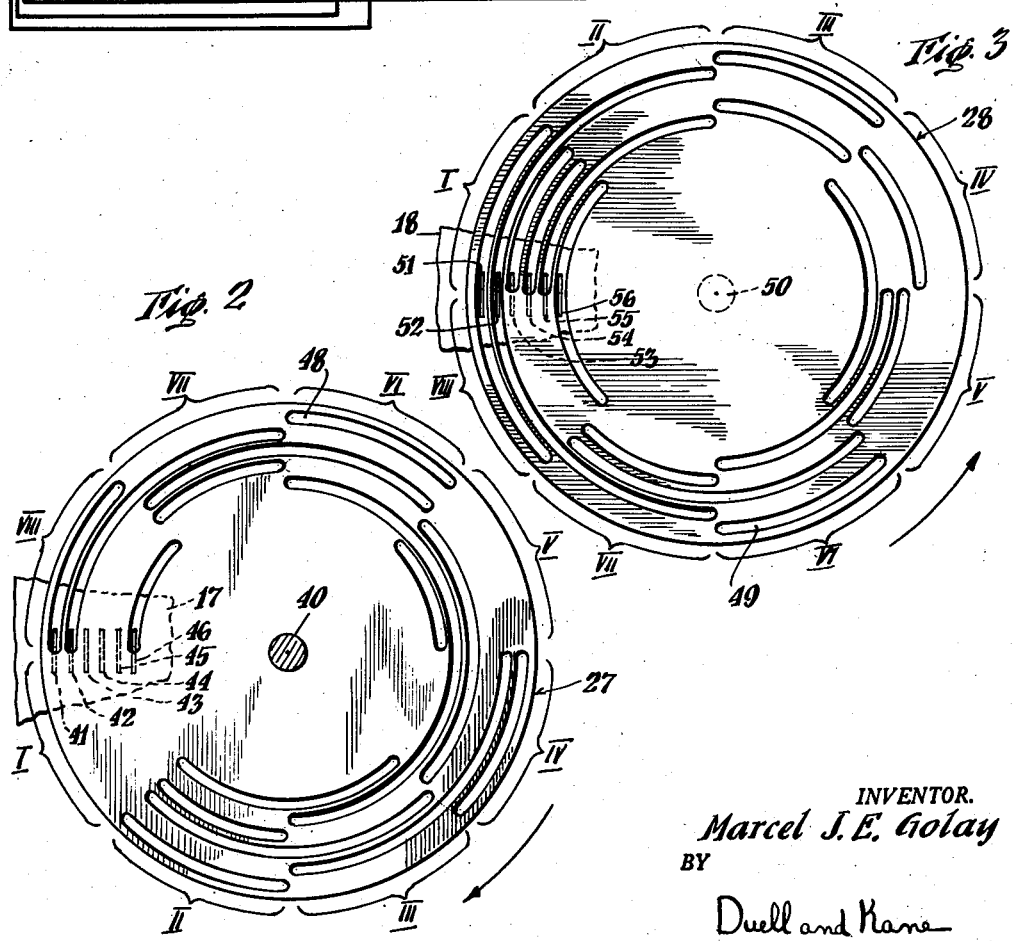
Fig. 2
Fig. 3
INVENTOR.
Marcel J. E. Golay
BY
Duell and Kane
ATTORNEYS March 17, 1953  M. J. E. GOLAY  2,631,489
MONOCHROMATOR Filed Jan. 12, 1949  2 SHEETS—SHEET 2

INVENTOR.
Marcel J. E. Golay
BY
Duell and Kane
ATTORNEYS

Patented Mar. 17, 1953

2,631,489

UNITED STATES PATENT OFFICE 2,631,489

MONOCHROMATOR

Marcel J. E. Golay, West End, N. J.

Application January 12, 1949, Serial No. 70,405

7 Claims. (Cl. 88—14)

This invention relates to spectrometry and more particularly to infrared spectrophotometry.

It is an object of this invention to provide an infrared monochromator which has an increased radiative output.

It is an object of this invention to provide a spectrophotometer which an increased signal to noise ratio of the detected radiative signals.

It is another object of this invention to provide a spectrophotometer which provides to a recording instrument signals permitting a greater speed of recording.

It is still another object of this invention to provide an apparatus with means for producing members having radiation modulating characteristics.

It is a further object of this invention to provide a spectrometer having greater spectral resolution.

It is a still further object of this invention to provide a recording spectrophotometer which has an increased signal to noise ratio or a greater speed of recording or greater resolution or a combination of these improvements.

With these and other objects in mind reference is had to the attached drawings illustrating one practical embodiment of the invention and in which:

Fig. 1 is a diagrammatic view shown in section and blocks illustrating the general arrangement of a spectrophotometer of my invention;

Fig. 2 is a front elevation of a scanning disc used in the spectrophotometer of Fig. 1;

Fig. 3 is a front elevation of another scanning disc used in the spectrophotometer of Fig. 1;

Figure 4:
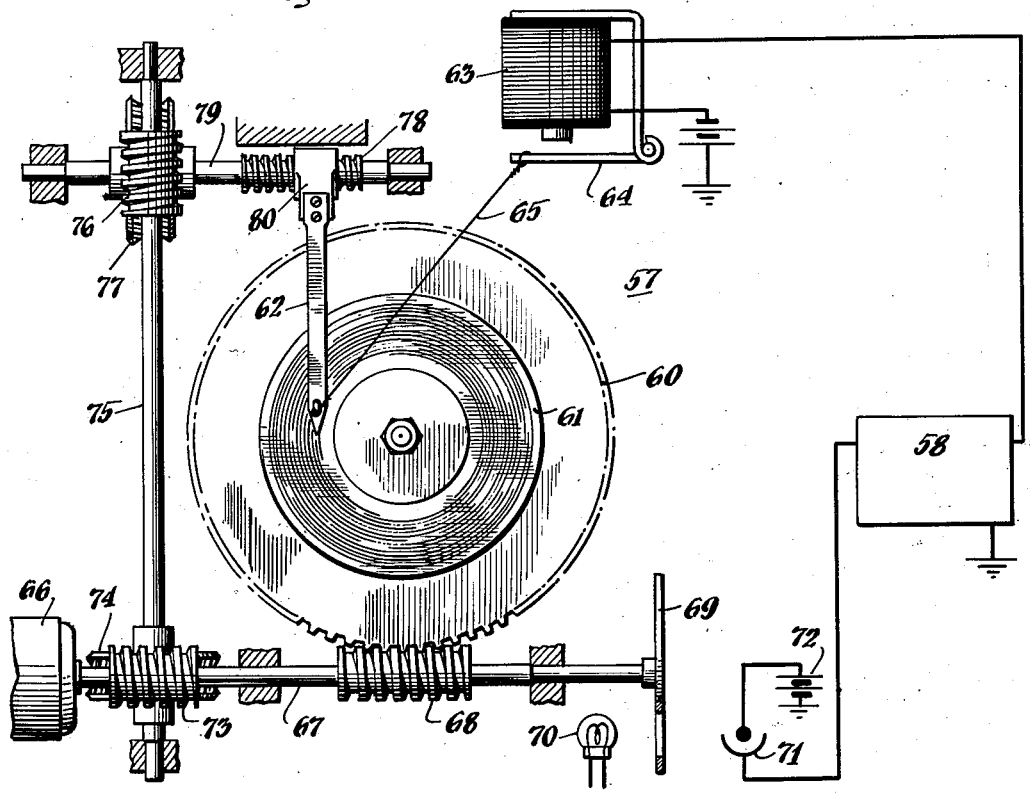
Fig. 4 is a plan view of a scribing device for marking the scanning discs of this invention.

In general this invention is directed to increasing the radiation analyzed in an infrared spectrophotometer while maintaining the resolving power of the spectrophotometer, as reflected in the records made by the recording instruments.

The principle of this invention is the widening of the entrance and exit apertures of a monochromator to admit more radiation and thereby increase the radiative output without sacrificing the resolving power of the monochromator. In order to obtain this result the widened entrance and exit apertures are subdivided into a number of slits. The radiations passing through these slits are subjected to a modulation, the purpose of which is to introduce onto the detecting instruments of the spectrophotometer of which the monochromator is a part, a radiation beam in which the radiations it is desired to select and measure has a distinguishing characteristic which makes it easily selectable and measured by the detector, this measure being substantially unaffected by the other radiations. This distinguishing characteristic can be a time modulation, and this time modulation can be obtained by various means. One such means is an "on" and "off" blocking of the slits in the spectrum to pass the unwanted radiations at a uniform intensity while passing and blocking alternately the wanted radiations. At the same time a definite signal is obtained to mark the "on" and "off" periods of the wanted radiations and this definite signal is utilized to transform the signal fluctuations registered by the detector and amplified in the associated circuits into a direct electrical output current which provides a measure of said wanted radiation. Methods and means for obtaining a direct current which contributes a measure of the fluctuations of said wanted radiation are disclosed and described in my co-pending application, Serial No. 24,204, filed April 30, 1948, Patent No. 2,502,319, entitled "Method and Apparatus for Measuring Radiation." The term monochromator as used in the description of this invention refers to a device for dispersing a spectrum and imparting a distinguishing character to one or more selected portions of the dispersed spectrum while not necessarily rejecting the remainder of the dispersed spectrum.

In Fig. 1 a spectrophotometer is shown incorporating the monochromator 10 of this invention. Radiation and more particularly infrared radiation emanating from a source 11 which may be a Nernst lamp, a "globar" or other suitable device produces a beam 12 which, after reflection by a flat mirror 13 and by a concave mirror 14 produces an image of source 11 which substantially fills entrance aperture 17. The radiation passed by aperture 17 is collimated by a second concave mirror 20, dispersed by prism 19, reflected by Littrow mirror 21, dispersed a second time by prism 19 and reconverged by mirror 20 on the exit aperture 18 after reflection by flat mirror 22. The emerging beam is reflected by mirror 23 and reconverged by concave lens 24 on a detector 26 which may be a thermopile, or a bolometer, or a pneumatic infrared detector, or a photocell, or any other suitable detector of radiant energy which yields an electrical output. For the purposes of this description the detector 26 and its attached amplifier and rectifier 31 are assumed to be the same as the detector and amplifier and rectifier shown and described in my above-mentioned co-pending application and the output of the amplifier-rectifier 31 is conducted by lead 32 to a suitable recorder.

To effect the "on" and "off" modulation of the wanted radiation while maintaining the unwanted radiations at a substantially constant level, entrance and exit apertures 17 and 18 are subdivided into a number of slits and as shown and described herein, the apertures 17 and 18 include six slits for the sake of illustration. Furthermore the monochromator is provided with two synchronously rotating opaque discs 27 and 28, the outer portions of which are adjacent to entrance and exit apertures 17 and 18 respectively and are slotted to permit radiation transmission. Figs. 2 and 3 illustrate the slotting arrangement of said discs and their positions with respect to the six slits constituting the entrance and exit apertures 17 and 18. Fig. 2 shows the disc 27 as viewed from the left end of spectrometer 10 as shown in Fig. 1, and Fig. 3 shows disc 28 as viewed from the top of the drawing to the bottom of the drawing as shown in Fig. 1. In Fig. 2 the six entrance slits of the entrance aperture 17 are shown partly in dotted outline behind the disc 27 and are numbered 41 to 46 respectively. In Fig. 3 the exit slit member 18 and its six slits 51 to 56 are shown partly in dotted outline. The slots 48 and 49 transmit radiation and are formed in six discontinuous circles having the axis of rotation 40 and 50 of the discs 27 and 28 as a center, in each of the discs 27 and 28, and in adjacence to the six slits in each of the entrance and exit apertures 17 and 18. The six entrance slits 41 to 46 and the six exit slits 51 to 56 are correlated in position with respect to each other and the optics of the monochromator. The radiation treated in this invention may be made up of a range of component radiations. These component radiations each may be considered as a portion of the spectrum it is desired to study. This portion of the spectrum or component of the radiation has certain physical distinguishing characteristics, whether it is part of the entire radiation treated by the apparatus of this invention or whether it is separated therefrom and is treated singly or by itself. When the portion of the spectrum it is desired to study, and which is also designated as wanted radiation, enters through slit 41 and egresses through slit 51, the same portion of the spectrum will enter through slit 42 and egress through slit 52, and pairs of slits 43 and 53, 44 and 54, 45 and 55, and 46 and 56, will likewise be corresponding slits for the desired portion of the spectrum. Referring to the desired portion of the spectrum, it is meant that for any given setting of the apparatus of this invention there will be a portion of the spectrum or a component of the radiation treated which will get preferential treatment from the apparatus. This portion of the spectrum or component of the radiation treated has definite physical characteristics which distinguish and identify it when it is both a part of the entire spectrum of the radiation treated and when it is single or alone.

The modulation of the radiation passing through the monochromator 10 is affected by synchronously rotating discs 27 and 28. The complete period of rotation of the discs 27 and 28 is divided for the purposes of this description into eight time intervals characterized by eight sections marked I to VIII in a clockwise direction around each of the discs 27 and 28. Time intervals I to IV inclusive will be referred to as the first half period and time intervals V to VIII inclusive will be referred to as the second half period.

From the arrangement of the slits 41 to 46 and slots 48 illustrated in Fig. 2, it will be seen that the wanted radiation which passes in through the center of slit 41 and out through slit 51 will be blocked during the first half period either by disc 27 or disc 28, whereas it will be allowed to pass during intervals VI and VIII when slits 41 and 51 are simultaneously uncovered by slots 48 and 49. Likewise, the passage of the wanted radiation through all the centers of the pairs of corresponding slits will be blocked by one or the other disc during the first half period whereas the passage of the wanted radiations will be allowed for two of the four time intervals in the second half period. On the other hand, it will be seen that an unwanted portion of the spectrum passing through the spectrometer through the center of entrance slit 41 and out through the center of exit slit 54 will be blocked at all times, and likewise the unwanted radiations passing through entrance and exit slits 42 and 55, 43 and 56, 44 and 51, 45 and 52, and 46 and 53, respectively, will be blocked at all times. Further, the passage of unwanted radiation in and out through the centers of any other noncorresponding pairs of slits will be allowed during one of the four time intervals of each half period and blocked during the other time intervals. Summarizing, the wanted radiation is blocked during the first half period and is permitted to pass through all of the corresponding pairs of slits for two out of four of the intervals in the second half period, whereas unwanted radiation is blocked from passing at any time through six of the noncorresponding pairs of entrance and exit slits and is permitted to pass through the other noncorresponding pairs of slits one out of the four time intervals in each of the half periods. Consequently, the wanted radiation is concentrated in the second half period whereas the unwanted radiation is distributed in equal amounts in both half periods, and during said second half period the six slits combination will pass said wanted radiation in a total amount which is three times larger than if only one slit of the same width had been used.

The radiation passing through the exit slit and focused on the detector is detected by the detector 26, and amplifier-rectifier combination 31, which, for the modification just described, must have a small built-up time constant when compared to the period of rotation of the discs, as well as a long decay time constant when compared to the same period. The amplified voltage derived from the amplifier is rectified in synchronism with the "on" and "off" half-periods of the wanted radiation in the sense that it produces a direct current which is a measure of the excess of radiative energy reaching the detector during the "on" half period when compared to the radiative energy reaching the detector during the "off" half period. The electronic processes employed for this purpose are well-known in the art and it will be readily realized that the electrical measure thus obtained reflects the wanted radiation only since the same amount of unwanted radiative energy reaches the detector during the "on" half period and during the "off" half period. The synchronizing signals needed for performing this synchronous rectification are generated by photocell 37 which is excited during one half period by the radiation 35 from source 36 while during the other half period the radiation 35 from the source 36 is blocked from the photocell 37 by chopping discs 34 which rotates synchronously with discs 27 and 28.

The determination of the arrangement of the patterns of slots 48 and 49 in the discs 27 and 28 will be best understood by assuming the circles are straightened into horizontal columns of ones (1) and zeros (0) in which the numbers "1" represent the light transmitting slots for a single time interval and the numbers "0" represent the opaque section for a single time interval. Accordingly the pattern of the two complementary discs 27 and 28 illustrated by Figs. 2 and 3 will be represented by the two following rectangular patterns in which the left half represents the first half period during which the wanted radiation is "off" and the right half represents the second half period during which the wanted radiation is on half of the time.

CHART I

Disc 27

| Intervals | I | II | III | IV | V | VI | VII | VIII |
|---|---|---|---|---|---|---|---|---|
| Slit 41 | 0 | 1 | 0 | 1 | 0 | 1 | 0 | 1 |
| Slit 42 | 0 | 0 | 1 | 1 | 0 | 0 | 1 | 1 |
| Slit 43 | 0 | 1 | 1 | 0 | 0 | 1 | 1 | 0 |
| Slit 44 | 0 | 1 | 0 | 1 | 1 | 0 | 1 | 0 |
| Slit 45 | 0 | 0 | 1 | 1 | 1 | 1 | 0 | 0 |
| Slit 46 | 0 | 1 | 1 | 0 | 1 | 0 | 0 | 1 |

CHART II

Disc 28

| Intervals | I | II | III | IV | V | VI | VII | VIII |
|---|---|---|---|---|---|---|---|---|
| Slit 51 | 1 | 0 | 1 | 0 | 0 | 1 | 0 | 1 |
| Slit 52 | 1 | 1 | 0 | 0 | 0 | 0 | 1 | 1 |
| Slit 53 | 1 | 0 | 0 | 1 | 0 | 1 | 1 | 0 |
| Slit 54 | 1 | 0 | 1 | 0 | 1 | 0 | 1 | 0 |
| Slit 55 | 1 | 1 | 0 | 0 | 1 | 1 | 0 | 0 |
| Slit 56 | 1 | 0 | 0 | 1 | 1 | 0 | 0 | 1 |

The time intervals are indicated horizontally across the page whereas the slits are presented vertically. Taking $f_m(t)$ and $f_m^*(t)$ to express the time modulation of the $m^{th}$ entrance slit and exit slit, respectively, the various functions of $t$ are represented by the successive values, zero (0) or one (1) indicated in the various rows. The passage or non-passage of the wanted and unwanted radiation may be determined from the study of the successive columns of the first pattern and of the corresponding columns of the second pattern. Furthermore, since the second pattern is identical to the first pattern except that the left half of both patterns are the reverse of each other, only the first pattern will be shown in what follows.

The generation of the functions $f_m(t)$, which will be referred to as binary functions of the first kind, can be effected arithmetically as follows. Consider the simple square pattern:

```
00
01
```

This pattern can be iterated into dimensions with the convention that every iteration will consist in adding to the right of and below any pattern thus formed, another identical but shifted pattern, and completing the square with a fourth pattern, formed by replacing the zeros (0) by ones (1) in the other three patterns and vice versa. Performing this operation three times on the pattern

```
00
01
``` yields, successively:

CHART III

```
00    0000    0000  0000
01    0101    0101  0101
      0011    0011  0011
      0110    0110  0110
              0000  1111
              0101  1010
              0011  1100
              0110  1001

0000  0000  0000  0000
0101  0101  0101  0101
0011  0011  0011  0011
0110  0110  0110  0110
0000  1111  0000  1111
0101  1010  0101  1010
0011  1100  0011  1100
0110  1001  0110  1001
0000  0000  1111  1111
0101  0101  1010  1010
0011  0011  1100  1100
0110  0110  1001  1001
0000  1111  1111  0000
0101  1010  1010  0101
0011  1100  1100  0011
0110  1001  1001  0110
```

It will be immediately recognized that if the first and fifth row in the third of the four patterns just written are suppressed, the remainder of said pattern is a replica of the rectangular pattern given earlier to represent schematically the slot pattern of Fig. 2.

It can be verified that if the first and ninth rows of the pattern of sixteen (16) given above are suppressed, the remaining fourteen (14) rows form binary functions of the first kind, $f_m(t)$, which, together with the complementary functions $f_n^*(t)$ satisfy the relation:

$$\int_0^1 f_m(t) f_n^*(t) p(t) \delta t = S_{m,n}$$

$$S_{m,n} = 0 \text{ if } m \neq n$$

$$S_{m,n} = \tfrac{1}{4} \text{ if } m = n$$

where $t$ represents the abscissa in the rectangular pattern of sixteen (16) and varies from zero (0) at the left to one (1) at the right, where $f_m^*(t)$ is equal to $f_m(t)$ between $t=\tfrac{1}{2}$ and $t=1$, and is the reverse of $f_m(t)$ between $t=0$ and $t=\tfrac{1}{2}$, in the sense that in said last mentioned interval $f_m^*(t)$ is one (1) where $f_m(t)$ was zero (0) and vice versa, and where the weight function $p(t)$ has the value minus one $(-1)$ between $t=0$ and $t=\tfrac{1}{2}$, and the value plus one $(+1)$ between $t=\tfrac{1}{2}$ and $t=1$. It is therefore apparent that up to fourteen (14) of the binary functions of the first kind expressed by the pattern of sixteen (16) can be utilized for as many circular strips in disc 27, while their complementary functions can be utilized for the strips of disc 28, whereby the output of the spectrograph can be increased up to seven (7) times.

In what has preceded, a detector of radiation has been postulated which is so faithful and quickly responsive that it has the facility of integrating uniformly the radiative input of every half period, while the synchronous rectification of its electrical output gives the weight $p(t) = -1$, to all radiative inputs registered during the first half or "off" period, which corresponds to values of $t$ comprised between zero (0) and one half ($\tfrac{1}{2}$), and the weight $p(t) = +1$ to all radiative inputs registered during the second half period, which corresponds to values of $t$ comprised between one half ($\tfrac{1}{2}$) and one (1). However, the postulation of this particular form of the weight function is equivalent to the postulation of a detector whose output in response to a square wave input has also a square wave form. It is well known that far infrared detectors form an important class of detectors whose characteristics exhibit a marked departure from the ideal characteristics permitting the employment of the weight function $p(t)$ postulated above. Any practical system of slit modulation should, therefore, take into account such forms of $p(t)$ as can be readily realized. One such form of $p(t)$ has been postulated which corresponds to the assumption that the detector employed responds to the fundamental frequency of a square wave having the same period as the period of rotation of the discs, but has a negligible response to the third and higher harmonics of such a square wave. The weight function which corresponds to such an assumption is a sine wave having the form $\sin 2\pi t$.

If this weight function is introduced in the integral given above, the form of this integral becomes $\int_0^1 f_m(t) f_n^*(t) \sin 2\pi t \delta t$, and it will be readily verified that the functions $f_m(t)$ and $f^*(t)$, which are represented by the successive rows in the patterns of eight (8) and sixteen (16), and by the same rows in which the left half has been inverted, respectively, do not, in general, reduce said integral to zero. However, it must be recalled that when radiations having an unwanted wave length enter, for instance, through slit 41 and pass through slit 52, other radiations having the same said unwanted wave length will also enter through slit 42 and pass through slit 53, etc. If, as will be the case in an efficient optical system, aperture 17 is uniformly illuminated, the overall effect of radiation having said unwanted wave length will be represented by the sum $$\sum^m f_m(t) f_{m+1}^*(t)$$

In order to facilitate the visualization of the processes and quantities involved in forming these sums, the pattern of fourteen (14) formed by the fourteen (14) utilized rows of the pattern of sixteen (16) shown previously, have been shown below as Chart IV and underneath these rows is a first row of numbers which, for each column, indicate the number of strips through which said unwanted radiation can enter disc 27 (which will now be assumed, together with disc 28, to have strips accommodating 14 entrance and 14 exit slits) and pass through a strip of disc 28 which is contiguous and just inside the strip corresponding to the strip through which said unwanted radiation has entered the monochromator. These numbers are readily obtained by counting, for every column of the left half of the pattern, the number of ones (1) underneath which is a zero (0), and for every column in the right half of the pattern, the number of contiguous pairs of ones (1).

CHART IV

```
0101  0101  0101  0101
0011  0011  0011  0011
0110  0110  0110  0110

0000  1111  0000  1111
0101  1010  0101  1010
0011  1100  0011  1100
0110  1001  0110  1001

0101  0101  1010  1010
0011  0011  1100  1100
0110  0110  1001  1001
0000  1111  1111  0000

0101  1010  1010  0101
0011  1100  1100  0011
0110  1001  1001  0110
```

| | | | | |
|---|---|---|---|---|
| 1 interval | 0634 | 1624 | 6043 | 6142 |
| 2 intervals | 0156 | 2244 | 5610 | 5322 |
| 3 intervals | 0422 | 3353 | 4022 | 4424 |
| 4 intervals | 0211 | 3454 | 3544 | 3010 |

Likewise, the sum $$\sum^m f_m(t) f_{m+2}^*t$$

which refers to unwanted radiation leaving the spectrograph through strips which are inside of and two strips removed from the strip corresponding to the entrance strip, can be obtained by counting, within each column, the number of ones (1) which are two lines above a zero (0) in the left half of the pattern, or two lines above another one (1) in the right half of the pattern. This sum is shown in the second line of numbers below the pattern of fourteen.

The third and fourth row of numbers are the sums $$\sum^m f_m(t) f_{m+3}^*(t)$$

and $$\sum^m f_m(t) f_{m+4}^*(t)$$

respectively.

If now we study the integrals $$\int \sum^m f_m t f_{m+s} \sin 2\pi t \delta t$$

we shall obtain a measure of the registered effect of unwanted radiation in the output of the detector, and, should this effect be particularly pronounced for certain values of $s$, a spectrographic record taken with such a system would exhibit what is known in the art as ghosts. As this is unwanted, it will therefore be the aim of the design and of the arrangement of the strips to yield the value zero for the last said integral.

Inasmuch as $$\sum^m f_m(t) f_{m+s}^*(t)$$

is a rational and discontinuous function, whereas $\sin 2\pi t$ is a continuous and irrational function, the only property which said two types of function can share is symmetry, and the functions $$\sum^m f_m(t) f_{m+s}^*(t)$$

will satisfy said last integral if they satisfy one of the following conditions:

a. Any one of said functions has the same value when $t=\frac{1}{2}-a$.

b. Any one of said functions has the same value when $t=a$ and when $t=\frac{1}{2}+a$.

c. Any one of said functions is the sum of two functions fulfilling the conditions $a$ and $b$.

It will be readily verified that neither of the functions represented by the four lines of numbers given under the pattern of fourteen (14) fulfill any one of the conditions above, and the production of patterns yielding functions which satisfy condition $a$, or condition $b$, will be described in what follows.

Consider the simple pattern 00
01 and apply to this pattern a two dimensional iteration process whereby passage from a pattern of $2^n$ elements on the side to a pattern of $2^{n+1}$ elements on the side is obtained as follows. The upper left quarter and the upper right quarter of the $Z^{n+1}$ pattern are each a reproduction of the $2^n$ pattern. The lower left quarter of the $Z^{n+1}$ pattern is symmetrical to the upper left quarter with respect to the horizontal median line, and the lower right quarter is formed by translating the lower left quarter and replacing the ones (1) by zeros (0) and vice versa. The first four patterns formed in this manner and starting with the elementary pattern

```
00
01
``` are shown in the following chart.

CHART V

| | | | | Ordinal Numbers | Cyclic Progression | | | | |
|---|---|---|---|---|---|---|---|---|---|
| 00 | 0000 | 0000 | 0000 | | | | | | |
| 01 | 0101 | 0101 | 0101 | | | | | | |
| | 0110 | 0110 | 0110 | | | | | | |
| | 0011 | 0011 | 0011 | | | | | | |
| | | 0011 | 1100 | 0000 | 0000 | 0000 | 0000 | 0000 | 0 |
| | | 0110 | 1001 | 0001 | 0001 | 0101 | 0101 | 0101 | 1 |
| | | 0101 | 1010 | 0010 | 0011 | 0110 | 0110 | 0110 | 0 |
| | | 0000 | 1111 | 0011 | 0010 | 0011 | 0011 | 0011 | 0 |
| | | | | 0100 | 0110 | 0011 | 1100 | 0011 | 1100 | 1 |
| | | | | 0101 | 0111 | 0110 | 1001 | 0110 | 1001 | 0 |
| | | | | 0110 | 0101 | 0101 | 1010 | 0101 | 1010 | 0 |
| | | | | 0111 | 0100 | 0000 | 1111 | 0000 | 1111 | 0 |
| | | | | 1000 | 1100 | 0000 | 1111 | 1111 | 0000 | 0 |
| | | | | 1001 | 1101 | 0101 | 1010 | 1010 | 0101 | 0 |
| | | | | 1010 | 1111 | 0110 | 1001 | 1001 | 0110 | 0 |
| | | | | 1011 | 1110 | 0011 | 1100 | 1100 | 0011 | 1 |
| | | | | 1100 | 1010 | 0011 | 1100 | 1100 | 1100 | 0 |
| | | | | 1101 | 1011 | 0110 | 0110 | 1001 | 1001 | 1 |
| | | | | 1110 | 1001 | 0101 | 0101 | 1010 | 1010 | 1 |
| | | | | 1111 | 1000 | 0000 | 0000 | 1111 | 1111 | 0 |

| | | | | |
|---|---|---|---|---|
| 1 interval | 0426 | 1537 | 7351 | 6240 |
| 2 intervals | 0743 | 2561 | 6125 | 4307 |
| 3 intervals | 0352 | 3245 | 5423 | 2530 |
| 4 intervals | 0066 | 4422 | 4422 | 0066 |

The two quadruple columns of numbers written besides the pattern of sixteen (16) are the binary ordinal number of the successive rows of said pattern, starting at four zeros, and the corresponding so-called cyclic progression numbers. The first binit (the term binit is utilized to describe any one of the characters forming a binary number, and is to the binary code what the digit is to the decimal code) of both binary and cyclic progression numbers are identical, and the $n$th binit of the cyclic progression number is obtained by reentering the $(n-1)$st and the $n$th binits of the binary number, in the sense that the re-entry of a zero (0) and a zero (0), and the re-entry of a one (1) and a one (1) are both a zero (0), and the re-entry of a zero (0) and a one (1), or vice versa, is a one (1). The individual element of the pattern of sixteen (16), in particular, and of any pattern of $2^n$ in general, which is made in accordance with the last described iteration process, can be determined by writing immediately above each other the ordinal binary number of the column of said element (starting the column number count at the left with zero) and the cyclic progression number of the row of said element, multiplying with each other the binits which are above each other, and re-entering the products of said multiplication, that is, assigning to said element the character zero (0) or one (1) depending upon whether the arithmetical sum of said products is even or odd, respectively.

The four lines of numbers below the pattern of sixteen (16) represent the four functions $$\sum^{m} f_m(t) f^*_{m+s}(t)$$

for the values of $s$ which are 1, 2, 3 and 4 respectively, and where the functions $f_m(t)$ and $f_m^*(t)$ represent, respectively, and for successive values of $m$, the successive rows of said pattern of sixteen (16) and the successive rows of the complementary pattern of sixteen formed by replacing the zeros (0) by ones (1), and vice versa, in the left half of said pattern of sixteen (16). It will be noted that the functions $$\sum^{m} f_m(t) f^*_{m+2s+1}(t)$$

satisfy condition $a$.

In order for all functions $$\sum^{m} f_m(t) f^*_{m+s}(t)$$

to satisfy conditions $a$ or $b$ a last transformation of the pattern of sixteen is needed, and is accomplished by means of what will be termed binary functions of the second kind, the generation of which will be described later. Any one of many binary functions of the second kind can be chosen and one of these functions has been written in the vertical line at the right of the last written pattern of sixteen (16). The pattern is corrected by means of said binary function of the second kind in the sense that all rows for which the odd binary function is a one (1) have their ones (1) replaced by zeros (0) and vice versa, whereas the other rows remain unchanged. The pattern thus obtained is shown below as Chart VI and the lines of numbers in this pattern and which represent the new functions $$\sum^{m} f_m(t) f^*_{m+s}(t)$$

can be seen to satisfy condition $a$ when $s$ is odd and to satisfy condition $b$ when $s$ is even.

CHART VI

```
0000 0000 0000 0000
1010 1010 1010 1010
0110 0110 0110 0110
0011 0011 0011 0011
1100 0011 1100 0011
0110 1001 0110 1001
0101 1010 0101 1010
0000 1111 0000 1111
0000 1111 1111 0000
0101 1010 1010 0101
0110 1001 1001 0110
0011 0011 1100 1100
1100 0011 0011 1100
0011 0011 1100 1100
0110 0110 1001 1001
1010 1010 0101 0101
0000 0000 1111 1111
```

| | | | | |
|---|---|---|---|---|
| 1 interval | 4444 | 3333 | 3333 | 4444 |
| 2 intervals | 3434 | 3434 | 3434 | 3434 |
| 3 intervals | 1441 | 4334 | 4334 | 1441 |
| 4 intervals | 3333 | 3333 | 3333 | 3333 |

The generation of the particular binary function of the second kind chosen in the Chart VI has been obtained for the upper half of the pattern of sixteen (16) by observing when the last two binits of the row ordinal number are both zeros (0), and by observing also when the second and third binits of said number are both zeros (0), the number one (1) being taken for the value of the odd binary function whenever either one or the other event occurs, and the value zero (0) being taken for all other cases, including the case when the last three binits are zero.

The odd binary function must be symetrical with respect to the horizontal median line, which furnishes the condition that below the median line either the last two binits of the last said ordinal number be ones (1) or that the second and third binits of last said number be ones (1).

Figure 5:
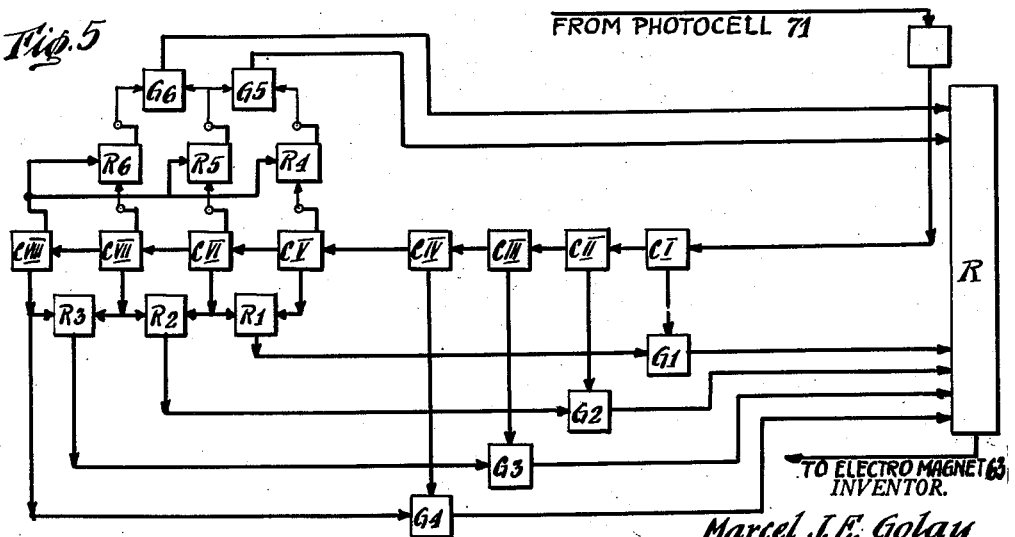
Fig. 5 is a block diagram of a computing circuit for determination of the light transmitting pattern of the scanning disc of this invention.

The various arithmetical operations shown above can be carried out by longhand computation and the strips can be cut in the discs by a manual operation in accordance with the patterns thus computed. A more mechanical process can consist of recording the various patterns as holes in a continuous tape which can be fed to an automatic machine for the operation of marking the discs; the same tape being used over and over for cutting many discs. Also, the computation of the various patterns can be made automatically by means of a computer, this last method being preferable when a great many slots must be cut in a disc. For instance, should one desire to make slots along 1024 concentric circles, each circle being divided into 1024 ($2^{10}$) parts, 1,048,576 ($2^{20}$) individual operations would be needed to calculate the "on" or "off" character of the complete patterns and it could be preferable to perform these arithmetical operations automatically. Fig. 4 illustrates a scribing machine 57 designed to make the slots in a disc for operation in a spectrometer of this invention and will be described more fully below. Fig. 5 illustrates in a schematic block diagram a computer 58 designed to perform automatically the computation of a pattern of sixteen by sixteen and which is shown as controlling the operation of the scriber mechanism of Fig. 4.

The central portion of the computer shown in Fig. 5 consists of an eight-stage binary counter comprising stages C-I, C-II, C-III, C-IV, C-V, C-VI, C-VII and C-VIII. If the computer is utilized while a disc is being cut, for every sixteenth of a turn of a disc on master wheel 60 an impulse adding one to the number registered by the counter 59 is fed to the first stage C-I. The state of stage C-VIII is gated by gate G-4 with the state of stage C-IV in the sense that only one of the four combinations of states of stages C-IV and C-VIII will cause either a one (1) or a zero (0) to be placed by a gate G-4 in the general re-entry circuit R. Further, the states of the successive stage pairs C-V—C-VI, C-VI—C-VII, and C-VII—C-VIII, are re-entered in re-entry circuits R-1, R-2, R-3 respectively, and the outputs of these re-entry circuits are gated with the stages C-I, C-II and C-III by gates G1, G2 and G3, respectively, the output of these gates being fed to the general re-entry circuit R. Finally, the stage C-VIII is re-entered with the stages C-V, C-VI and C-VII and these re-entries are gated by pairs in gates G-5 and G-6, the output of these gates being also fed to the general re-entry circuit R which determines the even or odd character of the number of gate outputs of one kind and generates correspondingly a signal which is utilized to decide whether or not the corresponding portion of the disc will have a slot cut.

In a computer designed for the generation of a pattern of $2^n \times 2^n$ there will be $2n$ counter stages, $n-1$ re-entries between the successive pairs of counters from $C_{n-1}$ to $C_{2n}$, $n-1$ gatings of said re-entries with the first $n-1$ counter stages, a gating of stages $C_n$ and $C_{2n}$, $n-1$ re-entries of the last stage with stages $C_{n+1}$ to $C_{2n-1}$ inclusive, $n-2$ gatings between the successive last named re-entries, and a general re-entry circuit for all said gates.

It can be easily verified that a $2n$ stage counter with only $n$ gates between the counter pairs $C_m$—$C_{m-n}$ and a general re-entry circuit can be utilized to generate the patterns first mentioned in this application, in which the iteration process forming a lower left quarter consists in shifting downwards the upper left quarter, whereas the introduction of the re-entries shown below the last four ($n$) counter-stages in Fig. 5 serve to change the iteration process just mentioned to one where the upper left quarter of a pattern is flopped over to form a lower left quarter which is symmetrical to the upper left quarter. Finally, the re-entry and gates shown above the counter in Fig. 5 serve to generate the binary functions of the second kind which form the correction needed to make all sum functions $$\sum_{m}^{m} f_m(t) f_{n+25}^*(t)$$

satisfy condition b.

While the circuit illustrated by Fig. 5 indicates that pairs of successive stages are re-entered in the blocks shown below the counters, patterns exhibiting the same desired symmetry could be obtained by reentering stage $C_{2n}$ with any of the stages $C_{n+2}$ to $C_{2n-1}$ inclusive, and gating this re-entry with stage $C_{n-1}$, then re-entering the chosen stage with any of the remaining stages in the $C_{n+2}$ to $C_{2n-1}$ group and gating this re-entry with stage $C_{n-2}$ and continuing thus from any last chosen stage in said group to any not yet chosen stage until they have all been utilized for re-entries, and then re-entering the last chosen stage with stage $C_{n+1}$ and gating this last re-entry with stage C-I.

Furthermore, while the circuit illustrated by Fig. 5 indicates that the successive re-entries formed by the blocks shown above the counters are gated with each other, patterns having the desired symmetry could also be obtained by gating the re-entry at the right as shown in Fig. 1, and formed by re-entering stages $C_{n+1}$ and $C_{2n}$ with any of the other re-entries, and continuing gating the last-chosen re-entry with any of the not yet chosen re-entries until all the re-entries shown above the counter have been used.

It is thus apparent that the circuit shown below the counter could be connected in $(n-2)!$ ways, and that the circuit shown above the counter could also be connected in $(n-2)!$ ways.

The blocks of Fig. 5 represent operations which can be performed in various ways well known in the art, utilizing means which could be electronic tubes or electrical relays.

While Fig. 1 illustrates the employment of slits and of discs circularly slotted, it will be apparent that if discs are made with fine slots these slots themselves can constitute the entrance and exit slits and members 17 and 18 can be dispensed with, provided a mask with a suitable aperture is substituted for one or both of said members in order to restrict the utilized focal surface of the monochromator to that portion of it which is optically satisfactory. Furthermore, while Fig. 1 illustrates the employment of discs of uniform thickness which are self-supporting, it may be practical to re-enforce these discs with radial ribs, or to support them with a disc of material which is substantially transparent to the radiation it is desired to analyze. For instance, if it is desired to analyze the infrared spectrum in the 1 to 15 micron range, these discs can be formed by evaporating a metallic layer on a disc of polished rock salt and the light-transmitting slots can be formed by removing circular portions of said metallic layer by means of a ruling tool.

The difference of the curvature of the circular slots which form the entrance and exit slits in the absence of members 17 and 18 should preferably be equal to the curvature calculated for one exit slit when one straight entrance slit is used, in order to realize as much resolving power as possible. As this may result in the utilization of slots and discs which differ widely in diameter, this may also result in a non-correspondence of the entrance and exit slot modulations over the entire utilized portion of the slots. This undesirable effect can be minimized in various ways. One way could consist of choosing discs having diameters which are in a simple ratio such as 3/2 and in gearing the two discs with the same gear ratio so that the speeds of their utilized outer portions are approximately equal. If then the desired patterns are repeated twice around the small disc and three times around the large disc, the image of one disc on the other disc through the optical system of the monochromator will mesh properly with the other disc. Another way could consist of not utilizing the complete functions $f_m(t)$ and $f_m^*(t)$ for the modulation of the various strips but in utilizing only part of these functions. For instance, if only the first, eighth, ninth and sixteenth columns of the last pattern of sixteen shown above were utilized to define a modulation of the four quadrants of sixteen slots, the unwanted radiation would still be distributed equally in both half periods provided, however, that the illumination of the utilized portion of the entrance slots were uniform.

Fig. 4 illustrates the mechanical portion of the ruling engine by means of which transparent slots are cut through opaque layers deposited on transparent discs. This cutting is carried out in accordance with a schedule which can be determined by the computer 58 such as shown in Fig. 5, or by prefabricated tapes. The ruling engine 57 is comprised of a main worm gear 60 with a number of teeth which is preferably an integral power of two (2) such as 16, as has been assumed for the computer shown, or 32, 64, 128, etc. The gear 60 carries the disc 61 on its upper surface. The disc is coated with an opaque layer and a scribing tool 62 serves to alternately cut transparent slots and leave the opaque layer intact in accordance with the commands received from the computer 68 by an electro-magnet 63 which has an armature 64 connected to the scribing tool 62 by means of a cord 65.

A motor 66 drives a shaft 67 and turns a worm 68. The shaft 67 carries a shuttered disc 69 which serves to interrupt the light beam from the lamp 70 to photocell 71, energized by source 72. The electrical impulses thus produced in the output photocell 71 are transmitted to computer 58 where they serve to time the electronic impulses delivered to electro-magnet 63. A worm 73 mounted on shaft 67 engages a worm gear 74 mounted on a shaft 75. Another worm 76 mounted on shaft 75 is geared with worm gear 77 which drives a worm 78 through a shaft 79. By the rotation of the shaft 79 a carriage 80 carrying the scribing tool 62 is displaced. The combined motions of the gear 60 and the scribing tool 62 cause the shape of the cutout transparent slots to be spiral rather than perfectly circular, for the circular shape would demand that the tools 62 be stationary for one complete turn of the gear 60 and then be displaced by the desired distance between successive slots. This procedure would require a more complicated, albeit readily designable by one familiar with the art, arrangement than the one illustrated by Fig. 4 and just described, but the departure from a strictly circular shape thus effected for the transparent slots is negligibly small, and no optical error of consequence will result when the patterns represented by the functions $f_m(t)$ and $f_m^*(t)$ are ruled only once around both entrance and exit discs. The disc 61 is detachably mounted on the upper main surface of gear 60 and after the ruling operation is completed can be removed for installation in a monochromator as illustrated in Fig. 1.

When discs with a great many slots are used, of the order of a hundred, I prefer not to space these slots at exactly equal distances apart, but in the case of the optical arrangement illustrated by Fig. 1, I prefer to decrease the spacing of the entrance slots progressively from the edge of disc 27 towards the center, or to increase progressively the spacing of the exit strips from the edge of disc 28 towards the center, or to do both, in order to effect a readily calculable correction for the circumstance that a progressively increasing departure from minimum deviation occurs for rays which enter the apparatus at increasingly greater distances from the optical center.

As an alternate method of obtaining the same wobbling modulating result as described herein, wobbling the Littrow mirror provides a very rapid examination of the spectrum and eliminates the use of rotating discs. In this case the discs are replaced by an immovable quadruple row of slits which are either open or closed in accordance, for instance, with the pattern of the first eighth, ninth and sixteenth columns of the pattern shown in Chart VI, for the entrance slits, and in accordance with the same four columns except for the reversal of the first and eighth columns for the exit slits. When the radiation passing through the exit slits corresponding to the reversed first and eighth column is received by one detector yielding a signal $S_1$ and when the radiation passing through the exit slits corresponding to the ninth and sixteenth columns is received by a second detector matched to the first and yielding a signal $S_2$, the difference signal $S_2 - S_1$ will be a measure of the wanted radiation, while the unwanted radiation which is divided into substantially equal amounts for the two detectors will not be substantially reflected in the difference $S_2 - S_1$.

While the specific dispersing means illustrated in the spectrometer 10 is a prism, it will be clear that other dispersing means such as a ruled grating could also be utilized, without restricting the scope of my invention, and that the curvature introduced by such other dispersing means in the image of a monochromatic bundle of radiation, as well as lacks of symmetry similar to those encountered when departing from the condition of minimum deviation in the case of prismatic dispersion, could be equally well calculated and corrected by one versed and skilled in the art. The spectrometric system of concave and flat mirrors, a prism and a Littrow mirror described herein and shown in Fig. 1 is merely illustrative of a radiation analyzer apparatus. Any conventional spectrometer for separation of radiation can be adjusted to accommodate the widening of the entrance and exit apertures and the modulations of the radiation of this invention. In practice the entrance and exit apertures 17 and 18 may be replaced by one or two simple masks with the slots of the discs acting simultaneously as entrance and exit slits to select the radiations and as "on" and "off" slits to modulate the radiations. Consequently the discs alone may be inserted in a variety of spectrometers and by adjustment of the components produce the above-described results.

There are undoubtedly many modulation schemes other than those described herein which could serve to impart a distinguishing characteristic to one or more portions of the spectrum analyzed by a multi-slit spectrometer. For instance, the various entrance and exit slits could be sinusoidally modulated or modulated on a regular "on"-"off" basis characterized by arithmetically progressing fundamental frequencies for the successive entrance and exit slits, and the radiation emerging from the monochromator would be characterized by the difference or sum frequencies which correspond each to a portion of the spectrum. The output of the detector could then be fed to a multiplicity of frequency analyzing electrical circuits or electro-mechanical vibrating members such as the reeds of a frequency meter, and in the latter instance the curve formed by one extreme position of the reed ends would represent the detail of a portion of the spectrum being analyzed. It will be apparent that the transmission discs described in these specifications could be replaced by reflexion discs, which could consist of reflecting discs coated by a nonreflecting layer, out of which strips are removed to provide, in effect, reflecting slots.

It will be clear that while my invention belongs to the art of spectrography and spectrophotometry, the proper design of apparatus based on the principals disclosed here will involve heavier borrowings from the art of photography than are needed in the case of conventional spectrographs. For instance, the employment of so-called Schmidt optics in spectrographs, which, at this writing, is just beginning, will offer far larger benefits when these benefits are two-dimensional, as in the case of my invention, than when they amount only to a lengthening of the allowable single slit length, as in the case of conventional spectrographs.

Thus, among others, the several objects of the invention as afore noted are achieved. Obviously numerous changes in construction and rearrangement of the parts might be resorted to without departing from the spirit of the invention as described above and as defined by the claims.

I claim:

1. A radiation analyzing spectrometer for passing a large amount of radiation through said spectrometer and accurately measuring a small spectral portion of said passed radiation comprising, a multiplicity of radiation-passing entrance and exit apertures, means for directing the radiation through said apertures, a first group of entrance apertures in said multiplicity of apertures, a second group of entrance apertures in said multiplicity of apertures, a first group of exit apertures in said multiplicity of apertures, a second group of exit apertures in said multiplicity of apertures, radiation blocking spaces in between and beside the apertures of said first group of entrance apertures, radiation blocking spaces in between and beside the apertures of said second group of entrance apertures, means for transmitting images of said entrance apertures and of said blocking spaces, said images being transmitted in said spectral portion of said radiation characterized by a selected wave length, said first group of exit apertures coinciding with said transmitted images of said first group of entrance apertures, and said second group of exit apertures coinciding with said blocking spaces between and beside the apertures of said second group of entrance apertures.

2. A radiation analyzing spectrometer as claimed in claim 1 in which the number of apertures of said first group of entrance apertures which are imaged in apertures on said first group of exit apertures by monochromatic radiation other than said spectral portion as characterized by said selected wave length is equal to the number of apertures of said second group of entrance apertures which are imaged on apertures of said second group of exit apertures by monochromatic radiation other than said spectral portion as characterized by said selected wave length.

3. In combination, a spectrometer as claimed in claim 2, a radiation detector, and means for focusing on said radiation detector the radiation passed by said groups of exit apertures.

4. In an infrared spectrometer, means for collimating a multiplicity of divergent beams of the radiation to be analyzed into substantially parallel beams, means for dispersing said substantially parallel beams, means for reconverging said dispersed beams into dispersed spectra, means for extracting from said dispersed spectra a multiplicity of output beams, means for firstly interrupting periodically said divergent beams at different rates, means for secondly interrupting periodically said output beams at different rates, a multiplicity of entrance and exit slits, and said means for periodically interrupting said beams in the form of two rotating discs with circular concentric slots to modulate the rotation passing through said entrance and exit slits.

5. In a radiation analyzing spectrometer, means for collimating a multiplicity of divergent beams of the radiation to be analyzed into substantially parallel beams, means for dispersing said substantially parallel beams, means for reconverging said dispersed beams into dispersed spectra, means for impinging said dispersed spectra on a detector for measuring said radiation, a first rotating opaque disc with radiation-passing concentric slots for modulating said divergent beams, a second rotating opaque disc with radiation-passing concentric slots for modulating said dispersed spectra, arrangement of said slots to provide a relation between the slots whereby the slots on the first disc are imaged at a wavelength which is a function of the setting of the internal optical parts of said spectrometer on corresponding slots on said second disc and whereby said detector measures the radiation characterized by said wavelength passed by the slots of said second disc.

6. In a radiation analyzing spectrometer, means for collimating a multiplicity of divergent beams of the radiation to be analyzed into substantially parallel beams, means for dispersing said substantially parallel beams, means for reconverging said dispersed beams into dispersed spectra, means for extracting from said dispersed spectra a multiplicity of output beams, firstly interrupting periodically said divergent beams at different rates, secondly interrupting periodically said output beams at different rates, a series of entrance slits and a series of exit slits, rotating transparent discs adjacent said entrance slits and said exit slits for passing the radiation which passes said slits, an opaque layer on one surface on each of said rotating discs, and transparent circular slots cut out of said opaque layer on each of said discs corresponding to said series of entrance and exit slits.

7. In a radiation analyzing spectrometer, means for collimating a multiplicity of divergent beams of the radiation to be analyzed into substantially parallel beams, means for dispersing said substantially parallel beams, means for reconverging said dispersed beams into dispersed spectra, detector means for receiving said dispersed spectra and measuring the radiations of said dispersed spectra, a series of entrance slits, a series of exit slits, transparent rotating discs adjacent said entrance slits and said exit slits for passing the radiation which passes said slits, an opaque layer on one surface of each of said rotating discs, discontinuous transparent slots in said opaque layers corresponding with said series of entrance and exit slits whereby every slit is masked and unmasked in turn separately and individually but in time relation to each other by passage of said discontinuous slots across said slits.

MARCEL J. E. GOLAY.

REFERENCES CITED

The following references are of record in the file of this patent:

UNITED STATES PATENTS

| Number | Name | Date |
|---|---|---|
| 1,377,322 | De Tartas et al. | May 10, 1921 |
| 2,039,355 | Seysenegg | May 5, 1936 |
| 2,078,768 | Meier | Apr. 27, 1937 |
| 2,227,510 | Pineo | Jan. 7, 1941 |
| 2,312,010 | Akker | Feb. 23, 1943 |
| 2,442,298 | Liston | May 25, 1948 |
| 2,451,572 | Moore | Oct. 19, 1948 |
| 2,458,973 | Barnes | Jan. 11, 1949 |
| 2,462,946 | Coggeshall et al. | Mar. 1, 1949 |

FOREIGN PATENTS

| Number | Country | Date |
|---|---|---|
| 348,090 | Great Britain | Oct. 29, 1929 |